US012783022B2

(12) United States Patent
Niu

(10) Patent No.: US 12,783,022 B2
(45) Date of Patent: Nov. 3, 2026

(54) PCIE CARD MODULE MECHANISM AND SERVER

(71) Applicant: SUZHOU METABRAIN INTELLIGENT TECHNOLOGY CO., LTD., Suzhou (CN)

(72) Inventor: Zhanlin Niu, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/155,536

(22) PCT Filed: Jun. 20, 2025

(86) PCT No.: PCT/CN2025/102520
§ 371 (c)(1),
(2) Date: Aug. 11, 2025

(87) PCT Pub. No.: WO2026/056397
PCT Pub. Date: Mar. 19, 2026

(65) Prior Publication Data

US 2026/0111062 A1 Apr. 23, 2026

(30) Foreign Application Priority Data

Sep. 13, 2024 (CN) ........................ 202411286335.4

(51) Int. Cl.
*G06F 13/00* (2006.01)
*G06F 1/186* (2026.01)
*G06F 13/42* (2006.01)

(52) U.S. Cl.
CPC .......... *G06F 1/186* (2013.01); *G06F 13/4221* (2013.01); *G06F 2213/0026* (2013.01)

(58) Field of Classification Search
None
See application file for complete search history.

(56) References Cited

U.S. PATENT DOCUMENTS

2023/0009926 A1* 1/2023 Tsorng ................. H05K 7/1409
2023/0051799 A1* 2/2023 Tsorng ................. H05K 7/1405
2023/0354534 A1 11/2023 Wang et al.

FOREIGN PATENT DOCUMENTS

CN 104679167 A 6/2015
CN 108646880 A 10/2018
(Continued)

OTHER PUBLICATIONS

CN117971011 (Year: 2024).*
(Continued)

*Primary Examiner* — Henry Tsai
*Assistant Examiner* — Dean Phan
(74) *Attorney, Agent, or Firm* — Scully, Scott, Murphy & Presser, P.C.

(57) ABSTRACT

The present disclosure provides a PCIE card module mechanism and a server. The PCIE card module mechanism includes: a frame body detachably mounted inside a chassis; a locking member connected to the chassis, the frame body is butted with the locking member when mounted inside the chassis; and a rotating handle. The rotating handle is rotatably connected to the frame body and has a locking position and an unlocking position, the rotating handle further is provided with a locking structure that is in locking fit with the locking member; when the rotating handle is located in the locking position, the locking structure and the locking member are in locking fit and lock the frame body onto the chassis; when the rotating handle is located in the unlocking position, the locking structure and the locking member are separated, and the frame body is able to be removed from the chassis.

20 Claims, 6 Drawing Sheets

(56) References Cited

FOREIGN PATENT DOCUMENTS

| | | | |
|---|---|---|---|
| CN | 109085892 | A | 12/2018 |
| CN | 109917871 | A | 6/2019 |
| CN | 110837278 | A | 2/2020 |
| CN | 111782008 | A | 10/2020 |
| CN | 114489269 | A | 5/2022 |
| CN | 117215375 | A | 12/2023 |
| CN | 117971011 | A | 5/2024 |
| CN | 118795998 | A | 10/2024 |

OTHER PUBLICATIONS

The search report of PCT application No. PCT/CN2025/102520 issued on Sep. 11, 2025.
The first search report of CN application No. 202411286335.4 issued on Oct. 20, 2024.
The second search report of CN application No. 202411286335.4 issued on Nov. 8, 2024.
The first office action of CN application No. 202411286335.4 issued on Oct. 22, 2024.

* cited by examiner

PCIE CARD MODULE MECHANISM AND SERVER

CROSS-REFERENCE TO RELATED APPLICATIONS

The present disclosure is a National Stage Filing of the PCT International Application No. PCT/CN2025/102520 filed on Jun. 20 2025, which claims the priority to Chinese Patent Application No. 202411286335.4, filed with China National Intellectual Property Administration (CNIPA) on Sep. 13, 2024 and entitled "PCIE Card Module Mechanism and Server", which is herein incorporated by reference in its entirety.

TECHNICAL FIELD

The present disclosure relates to the technical field of computers, and in particular to a PCIE card module mechanism and a server.

BACKGROUND

A peripheral component interconnect express (PCIE) add-in card module is an important component of a server system, and is responsible for transmission of system data, computation, and other functions. A PCIE card needs to be often maintained and replaced for the server system. The PCIE add-in card module is usually fixed on the entire system by using a screw. In this traditional design method using a screw fixing structure, a tool such as a screwdriver needs to be used to mount and remove components of the PCIE add-in card module. As a result, it is inconvenient to mount and remove the components; the operation efficiency is low; and there is a risk that the PCIE card may be collided to be damaged. In some solutions, a design mechanism of a tool-free maintenance latch member is used. Specifically, a single-sided fixing and locking method is used. Consequently, in one aspect, the other side is prone to warping, leading to unfirm fixing and unstable operation of the PCIE card. In another aspect, there are design defects of high costs, troublesome operation, inability of automatic returning, and the like. In addition, when a relevant empty PCIE card slot stop piece is designed, the stop piece is usually not fixed firmly. The stop piece easily falls off during vibration and transportation, and it is inconvenient for removal.

SUMMARY

The present disclosure provides a PCIE card module mechanism and a server, to at least solve the problem that it is inconvenient to mount and remove a PCIE add-in card module in the related art.

Some embodiments of the present disclosure provide a PCIE card module mechanism, including: a frame body detachably mounted inside a chassis; a locking member connected to the chassis, the frame body is butted with the locking member when mounted inside the chassis; and a rotating handle. The rotating handle is rotatably connected to the frame body and has a locking position and an unlocking position. The rotating handle further is provided with a locking structure that is in locking fit with the locking member. When the rotating handle is located in the locking position, the locking structure and the locking member are in locking fit and lock the frame body onto the chassis. When the rotating handle is located in the unlocking position, the locking structure and the locking member are separated, and the frame body is able to be removed from the chassis.

In some embodiments, the locking member includes a locking recess; the locking structure is a locking protrusion; and when the rotating handle is in the locking position, the locking protrusion is located inside the locking recess and prevents the frame body from moving in a direction of being separated from the chassis.

In some embodiments, the locking member includes a first section and a second section that are connected in sequence in an axial direction; a diameter of the first section is less than a diameter of the second section; the second section is closer to the frame body than the first section; a circumferential side surface of the first section forms the locking recess; the rotating handle is provided with an extension section that is in bending connection; the extension section is provided with a groove; a side edge of the groove forms the locking structure; and when the rotating handle is located in the locking position, the first section is located inside the groove.

In some embodiments, the PCIE card module mechanism further includes a guide sleeve; the guide sleeve is connected to the frame body; the guide sleeve is provided with a guide through hole; and when the frame body is butted with the chassis, the locking member is arranged inside the guide sleeve in a penetrating manner.

In some embodiments, the PCIE card module mechanism further includes a reset member; the reset member abuts against the rotating handle and provides a reset force for the rotating handle to rotate towards the locking position.

In some embodiments, the frame body is provided with a stop structure; and the stop structure is located on a rotation path of the rotating handle and prevents a rotation of the rotating handle when the rotating handle is rotated to the locking position or the unlocking position.

In some embodiments, the stop structure includes a first stop structure and a second stop structure; the first stop structure and the second stop structure are respectively located on two opposite sides of the rotating handle; the rotating handle abuts against the first stop structure when rotated to the locking position; and the rotating handle abuts against the second stop structure when rotated to the unlocking position.

In some embodiments, the frame body is provided with a first side and a second side that are opposite to each other; the locking member is located on the second side; the first side is provided with an avoidance recess; one end, located on the first side, of the rotating handle is provided with the locking structure; and one end, located on the second side, of the rotating handle is located inside the avoidance recess.

In some embodiments, the rotating handle is provided with a rotating hole; the frame body is provided with a connecting post; a length of the connecting post is greater than a length of the rotating hole; a diameter of the rotating hole is greater than a diameter of the connecting post; and the PCIE card module mechanism further includes a fastener; and the fastener is connected to the connecting post and abuts against an end surface of the rotating hole.

In some embodiments, an operation recess for allowing a user to insert a hand is provided on a side surface of the rotating handle; and/or the rotating handle is an integrated plastic component.

In some embodiments, the frame body is provided with a mounting port for installing components; the PCIE card module mechanism further includes a cover member; and the cover member is detachably arranged at the mounting port and is able to cover the mounting port.

In some embodiments, the cover member includes a first end and a second end; the frame body is provided with a socket; the first end is plugged into the socket; the second end is provided with a limiting structure that matches the frame body; and the limiting structure is in limiting fit with the frame body.

In some embodiments, a second end of the cover member is provided with a limiting protrusion formed by bending; the limiting protrusion is used as the limiting structure; the frame body is provided with a through hole; and when a first end of the cover member extends into the socket, the limiting protrusion is located inside the through hole.

In some embodiments, a surface, facing an inner side of the frame body, of the cover member is provided with a protruding portion for operation.

In some embodiments, the PCIE card module mechanism further includes a latch member; the latch member is movably connected to the frame body and is located at one end of the cover member; and the latch member has a blocking position that prevents the cover member from being separated from the frame body and an avoidance position that avoids a removal of the cover member.

In some embodiments, the latch member is provided with a claw structure which is deformable; the frame body is provided with a protruding structure; and when the latch member is located in the blocking position, the protruding structure abuts against the claw structure and prevents the latch member from moving towards the avoidance position.

In some embodiments, the latch member is provided with a first rotating shaft and a second rotating shaft; the first rotating shaft is located in an end region of a side edge of the latch member, and the second rotating shaft is located in a middle region of the side edge of the latch member; and the latch member is rotatably connected to the frame body through the first rotating shaft and the second rotating shaft.

In some embodiments, the frame body includes a first frame body portion and a second frame body portion; the first frame body portion and the second frame body portion form an accommodating region for accommodating components; the frame body is provided with a front end and a rear end that are opposite to each other; the rotating handle is located at the front end; the PCIE card module mechanism further includes a cover member and a latch member; both the cover member and the latch member are located at the rear end; the locking member includes a first section and a second section that are connected in sequence in an axial direction; a diameter of the first section is greater than a diameter of the second section; the second section is closer to the frame body than the first section; one end of the rotating handle is provided with an extension section that is in bending connection; the extension section is provided with a groove; when the rotating handle is located in the locking position, the first section is located inside the groove; a side edge of the extension section abuts against an end surface of the second section and prevents the frame body from moving in a direction of being separated from the chassis; a middle region of the rotating handle is provided with a rotating hole; the frame body is provided with a connecting post; the connecting post is located inside the rotating hole; the rotating handle is rotatable relative to the connecting post; the PCIE card module mechanism further includes a reset member; the reset member is sleeved between the connecting post and the rotating hole and provides a reset force for the rotating handle to rotate towards the locking position; the cover member includes a first end and a second end; the first end is plugged into the frame body; the second end is provided with a limiting protrusion formed by bending, and an extension direction of the limiting protrusion is parallel to a moving direction in which the first end is plugged into the frame body; the frame body is provided with a through hole; when the first end of the cover member extends into the frame body, the limiting protrusion extends into the through hole and prevents the cover member from moving in a direction perpendicular to a direction of being plugged into the frame body; the latch member is a sheet metal part and is rotatably connected to the frame body; the latch member is located at the second end of the cover member; a claw structure is provided at two ends of the latch member; the frame body is provided with a protruding structure; and when the latch member is flipped to a position for blocking the cover member, the claw structure deforms and crosses over the protruding structure, and the protruding structure prevents the claw structure from being reversely flipped.

Some other embodiments of the present disclosure provide a server, including a chassis and the PCIE card module mechanism. The PCIE card module mechanism is detachably arranged inside the chassis.

According to the technical solutions of the present disclosure, the locking member is arranged on the chassis and the rotating handle is arranged on the frame body. A rotation of the rotating handle is able to change a locking fit relationship between the rotating handle and the locking member, so that when the frame body is mounted on the chassis, the frame body only needs to be placed in the corresponding position, thereby enabling the locking structure of the rotating handle to be aligned with the position of the locking member. Then, the rotating handle is rotated to form the locking fit relationship between the locking structure and the locking member. In this way, the frame body is able to be locked on the chassis through the locking fit relationship between the locking structure and the locking member. When removal is required, the rotating handle only needs to be reversely rotated, thereby releasing the locking fit relationship between the locking structure and the locking member, to remove the frame body from the chassis. Components such as a screw are not required in the above arrangement mode. Mounting and removal are able to be implemented by rotating the rotating handle, thus making an entire mounting and removal process convenient and efficient and improving a working efficiency. Moreover, since an operation is to rotate the rotating handle, a damage to a fan caused by mis-touch of a PCIE card is reduced. In addition, the PCIE card module mechanism has a simple overall structure and low costs and meets tool-less, low-cost, and high-reliability demands, and overall maintenance and application performance of the PCIE card module mechanism is improved.

Figure 1:
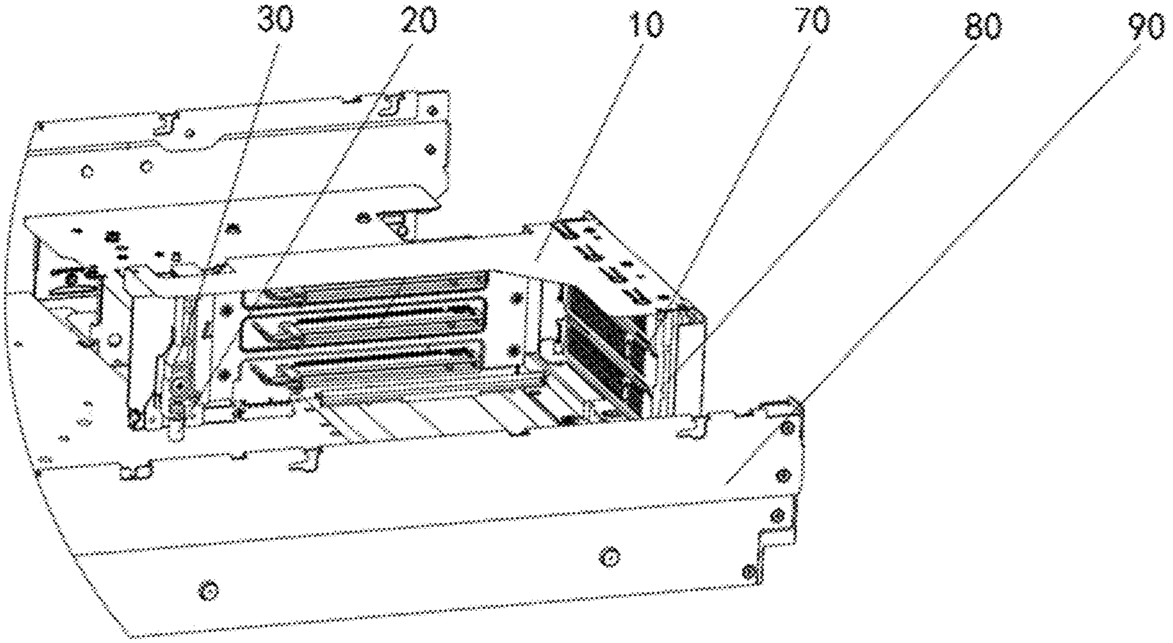
FIG. 1 is a structural schematic diagram of a PCIE card module mechanism as applied in a server according to the present disclosure.

10: frame body; 11: first stop structure; 12: second stop structure; 13: avoidance recess; 14: connecting post; 15: protruding structure; 20: locking member; 21: locking recess; 30: rotating handle; 31: locking structure; 32: extension section; 33: groove; 34: operation recess; 40: guide sleeve; 50: reset member; 60: fastener; 70: cover member; 71: limiting structure; 72: protruding portion; 80: latch member; 81: claw structure; 82: first rotating shaft; 83: second rotating shaft; and 90: chassis.

DETAILED DESCRIPTION OF THE EMBODIMENTS

It should be noted that the embodiments in the present disclosure and features in the embodiments may be mutually combined without conflicts. The present disclosure will be described in detail below with reference to the accompanying drawings and the embodiments.

It should be noted that unless otherwise specified, all technical and scientific terms used in the present disclosure have the same meanings as commonly understood by a person of ordinary skill in the art to which the present disclosure belongs.

In the present disclosure, without any contrary indication, directional words such as "up, down, top, and bottom" are usually used for the directions shown in the accompanying drawings, or for components themselves in vertical, perpendicular, or gravitational directions. Similarly, for ease of understanding and description, "inside and outside" mean the inside and outside relative to the contour of each component itself, but the above directional terms are not used to limit the present disclosure.

In order to solve the problem that it is inconvenient to mount and remove a PCIE add-in card module in the related art, the embodiments of the present disclosure provide a PCIE card module mechanism and a server.

The PCIE card module mechanism shown in FIGS. 1-11 includes a frame body 10 detachably mounted inside a chassis 90; a locking member 20 connected to the chassis 90, and a rotating handle 30. The frame body 10 is butted with the locking member 20 when mounted inside the chassis 90. The rotating handle 30 is rotatably connected to the frame body 10 and has a locking position and an unlocking position. The rotating handle 30 further is provided with a locking structure 31 that is in locking fit with the locking member 20. When the rotating handle 30 is located in the locking position, the locking structure 31 and the locking member 20 are in locking fit and lock the frame body 10 onto the chassis 90. When the rotating handle 30 is located in the unlocking position, the locking structure 31 and the locking member 20 are separated, and the frame body 10 is able to be removed from the chassis 90.

In the embodiment, the locking member 20 is arranged on the chassis 90 and the rotating handle 30 is arranged on the frame body 10. A rotation of the rotating handle 30 is able to change a locking fit relationship between the rotating handle 30 and the locking member 20, so that when the frame body 10 is mounted on the chassis 90, the frame body 10 only needs to be placed in the corresponding position, thereby enabling the locking structure 31 of the rotating handle 30 to be aligned with the position of the locking member 20. Then, the rotating handle 30 is rotated to form the locking fit relationship between the locking structure 31 and the locking member 20. In this way, the frame body 10 is able to be locked on the chassis 90 through the locking fit relationship between the locking structure 31 and the locking member 20. To remove the frame body 10 from the chassis 90, the rotating handle 30 only needs to be reversely rotated to release the locking fit relationship between the locking structure 31 and the locking member 20. Components such as a screw are not required in the above arrangement mode. Mounting and removal are able to be implemented by rotating the rotating handle 30, thus making an entire mounting and removal process convenient and efficient and improving a working efficiency. Moreover, since an operation is to rotate the rotating handle 30, a damage to a fan caused by mis-touch of a PCIE card is reduced. In addition, the PCIE card module mechanism has a simple overall structure and low costs and meets tool-less, low-cost, and high-reliability demands, and overall maintenance and disclosure performance of the PCIE card module mechanism is improved.

As shown in FIGS. 2-5, in the embodiment, the locking member 20 includes a locking recess 21. The locking structure 31 is a locking protrusion. An opening of the locking recess 21 does not face a rotation center of the rotating handle 30. That is, the locking recess 21 is located on a side surface of the locking member 20. That is, in FIG. 1, the rotating handle 30 is located above the locking member 20, and the locking recess 21 is located on left and right side surfaces of the locking member 20. In this case, the opening of the locking recess 21 faces laterally. In this way, when the rotating handle 30 is rotated, the locking protrusion is able to approach and extend into the locking recess 21 until the rotating handle 30 is rotated to the locking position. The locking protrusion is located inside the locking recess 21 and abuts against an inner wall surface of the locking recess 21, that is, an upper surface of the locking recess 21, so that the locking protrusion and the locking recess 21 cooperate to prevent the frame body 10 from moving in the direction of being separated from the chassis 90, thereby locking the frame body 10 onto the chassis 90.

In the embodiment, the locking member 20 and the rotating handle 30 essentially employ claw-type plugging fit. Specifically, the entire locking member 20 is a pin shaft structure, which includes a first section and a second section that are connected in sequence in an axial direction. A diameter of the first section is less than a diameter of the second section. That is, the first section is a small-diameter section, and the second section is a large-diameter section. The second section is closer to the frame body 10 than the first section, that is, the second section is located above the first section. In this way, a circumferential side surface of the first section naturally forms a recess which is the locking recess 21. Meanwhile, a step surface is naturally formed between the second section and the first section. The step surface is the inner wall surface of the locking recess 21, namely, the upper surface. Correspondingly, the rotating handle 30 is provided with an extension section 32 that is in bending connection. An extension direction of the extension section 32 is not parallel to an axial direction of the locking member 20, and an end portion of the extension section 32 is provided with a groove 33. Due to an arrangement of the groove 33, a side edge of the groove 33 naturally forms a protruding portion which is the locking structure 31. When the rotating handle 30 is switched to the locking position, the groove 33 gradually approaches the first section. When the rotating handle 30 is rotated to the locking position, the first section is located inside the groove 33, and the locking structure 31 is located inside the locking recess 21. In this case, the locking structure 31 is able to be in abutting fit with the step surface at the first section to limit removal of the frame body 10.

Figure 3:
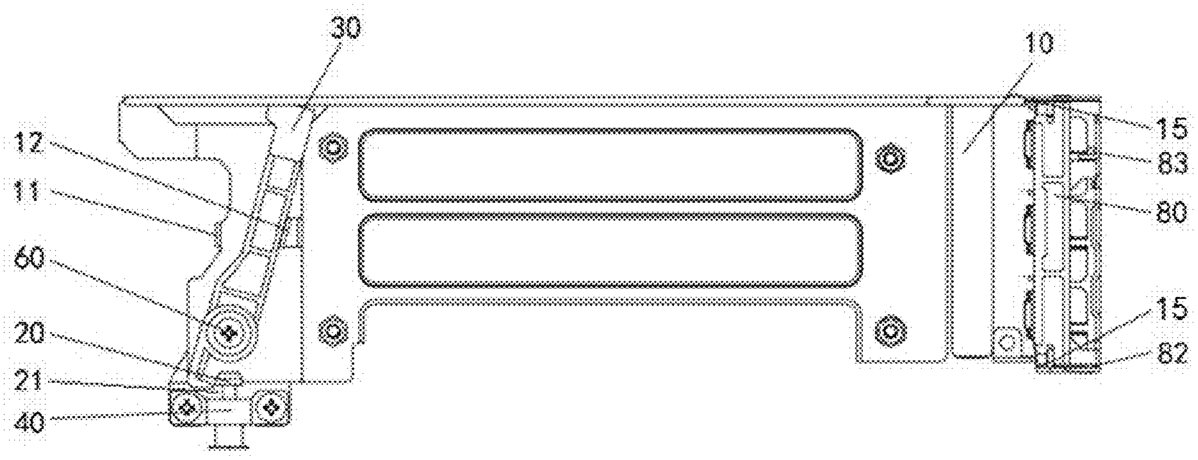
FIG. 3 is a front view of FIG. 2.
Figure 4:
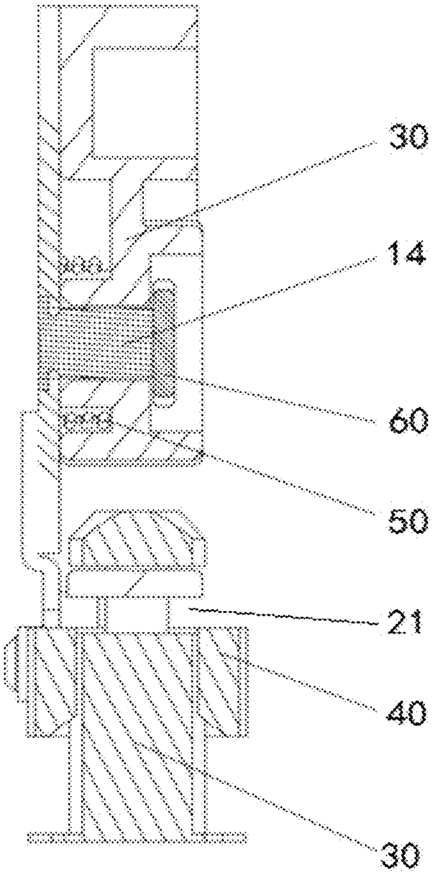
FIG. 4 is a side cross-sectional view of a rotating handle.

As shown in FIGS. 3-4, due to a coaxial arrangement of the first section and the second section in the embodiment, an annular locking recess 21 is essentially formed in the circumferential side surface of the first section. Meanwhile, considering stability of connection between the locking member 20 and the chassis 90, the locking member 20 in the embodiment further includes a connecting section, the connecting section is also a section with a diameter greater than the diameter of the first section and is located at one end, away from the second section, of the first section. The connecting section is connected to the chassis 90, so that the locking member 20 is able to be stably mounted and fixed on the chassis 90, thereby ensuring stability and reliability of a locking effect of the locking member 20.

In an embodiment, in addition to the above arrangement mode, a groove 33 such as a square groove is also able to be directly formed in a side surface of the locking member 20 as the locking recess 21. In this case, the locking recess 21 is only able to cover a part of a circumferential portion. Meanwhile, the locking structure 31 is able to be set as a bent protrusion. By rotating the handle 30, the bent protrusion is able to extend into or exit the groove 33 to change the locking fit relationship between the rotating handle 30 and the locking member 20, thereby implementing mounting and removal of the frame body 10. Compared with the arrangement mode of the embodiment, the above mode needs to ensure that the locking structure 31 and the locking groove 33 are more accurately aligned during the mounting of the frame body 10, and the locking member 20 needs to be fixedly connected to the chassis 90 in an integrated molding or welding manner. In the embodiment, due to the foregoing arrangement form of the locking member 20, the locking structure 31 and the locking recess 21 only need to be roughly aligned, so that a requirement for the accuracy of alignment is lowered. Furthermore, the locking member 20 is able to be rotatably arranged on the chassis 90 in a penetrating manner. The locking member 20 and the chassis 90 are able to be connected by using a plunger or in another simple way, so that it is easier to mount, connect, and remove the locking member 20.

Figure 2:
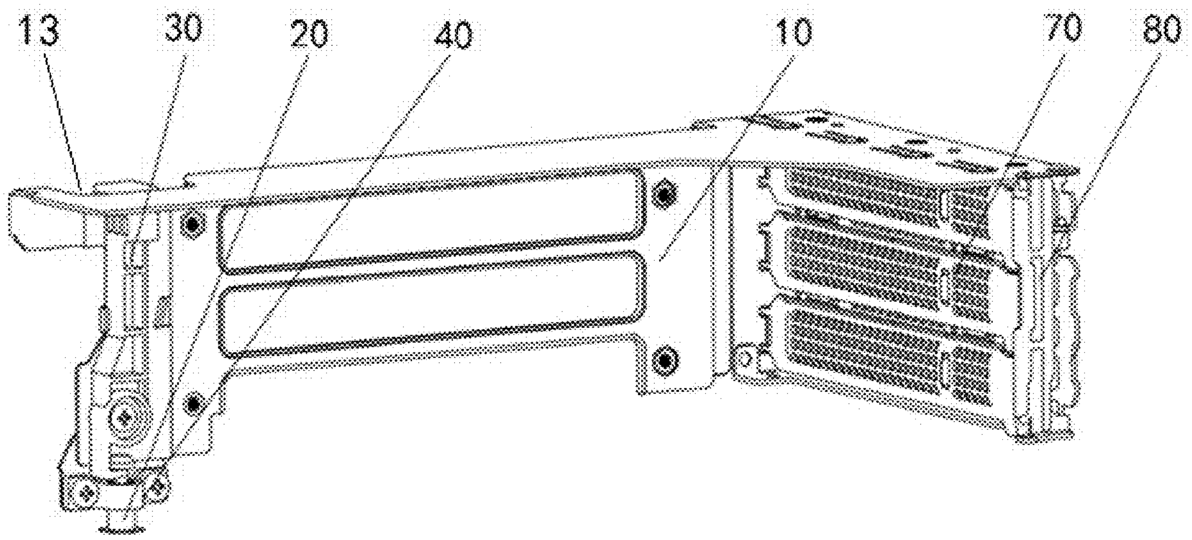
FIG. 2 is a structural schematic diagram of a PCIE card module mechanism according to the present disclosure.

As shown in FIGS. 2-3, in the embodiment, the PCIE card module mechanism further includes a guide sleeve 40. The guide sleeve 40 employs a sleeve-shape structure. The guide sleeve 40 is connected to the frame body 10 and is arranged at a position in which the locking structure 31 of the rotating handle 30 is arranged. The guide sleeve 40 is provided with a guide through hole for the locking member 20 to be inserted through. In this way, when the frame body 10 is butted with the chassis 90, the locking member 20 is inserted through the guide sleeve 40 by controlling the position of the frame body 10. Thus, on the one hand, the mounting position of the frame body 10 is fixed to ensure that the mounting position of the frame body 10 is accurate and stable, thereby avoiding damage to components caused by misalignment. On the other hand, during operation, the position of the frame body 10 is relatively fixed through the cooperation between the guide sleeve 40 and the locking member 20, thereby avoiding arbitrary movement of the frame body 10 and ensuring a smooth locking operation. In an embodiment, in addition to using the guide sleeve 40 for positioning, other forms for positioning are also able to be provided. For example, a positioning post and a positioning hole are separately arranged between the frame body 10 and the chassis 90. The positioning post extends into the positioning hole to implement an accurate mounting position of the frame body 10 on the chassis 90.

As shown in FIG. 4, in the embodiment, the PCIE card module mechanism further includes a reset member 50. The reset member 50 abuts against the rotating handle 30 and provides a reset force for the rotating handle 30 to rotate towards the locking position. Since the rotating handle 30 of the embodiment is rotatably connected, the reset member 50 of the embodiment employs a torsion spring. The torsion spring is sleeved at a rotatable connection position between the rotating handle 30 and the chassis 90. Two ends of the torsion spring respectively abut against the chassis 90 and the rotating handle 30, so that the rotating handle 30 is always maintained in the locking position under a driving of the reset member 50 when not in operation. On the one hand, automatic resetting and automatic locking are able to be implemented, and on the other hand, unexpected unlocking caused by vibrations of a server is avoided, thereby ensuring stability and reliability of locking fit. In an embodiment, in addition to employing the torsion spring, the reset member 50 is also able to employ a linear spring. The linear spring is able to abut against a side surface of the rotating handle 30 in a length direction, thereby providing a force for the rotating handle 30 to rotate and causing the rotating handle 30 to automatically switch and remain in the locking position.

As shown in FIG. 3, in the embodiment, the frame body 10 is provided with a stop structure which is located on a rotation path of the rotating handle 30. The stop structure is able to employ a convex rib or another structure as needed. A main function of the stop structure is to control a rotation range of the rotating handle 30, so as to avoid a situation in which the rotating handle 30 is rotated excessively. Therefore, when the rotating handle 30 is rotated to the locking position or the unlocking position, the rotating handle 30 abuts against the stop structure, thereby preventing the rotating handle 30 from continuing to rotate.

Considering that positions to which the rotating handle 30 is rotated include the locking position and the unlocking position, the stop structure of the embodiment includes a first stop structure 11 and a second stop structure 12. The first stop structure 11 and the second stop structure 12 are respectively located on two opposite sides of the rotating handle 30. In this way, when the rotating handle 30 is rotated in place in two directions, the rotating handle 30 is able to be respectively in stopping and limiting fit with the first stop structure 11 and the second stop structure 12. That is, when the rotating handle 30 is rotated to the locking position, the rotating handle 30 abuts against the first stop structure 11. When the rotating handle 30 is rotated to the unlocking position, the rotating handle 30 abuts against the second stop structure 12. In this way, it ensures that the rotating handle 30 is able to be rotated within a range only, to ensure stability and reliability. In an embodiment, only one of the first stop structure 11 and the second stop structure 12 is able to be selectively set as needed.

In the embodiment, the frame body 10 is provided with a first side and a second side that are opposite to each other.

The locking member 20 is located on the second side. The first side and the second side in the embodiment are described with reference to the locking fit relationship between the frame body 10 and the chassis 90. That is, one side of the frame body 10 that is locked through the fit between rotating handle 30 and the locking member 20 is the second side, and the other side opposite to the second side is the first side. With reference to the direction in FIG. 1, an upper side of the frame body 10 is the first side, and a lower side is the second side. One end, located on the first side, of the rotating handle 30 is provided with the locking structure 31, thereby implementing the locking fit with the locking member 20 on the first side. In order to ensure the smooth rotation of the rotating handle 30, the second side is provided with an avoidance recess 13. One end, located on the second side, of the rotating handle 30 is located inside the avoidance recess 13, so that the rotating handle 30 is able to be rotated smoothly and avoid the impact on locking and unlocking operations caused by interference between the rotating handle 30 and the frame body 10. It should be noted that in the embodiment, considering the convenience of operation, the rotating handle 30 is designed with a particular length to facilitate a user to perform an operation. In an embodiment, in addition to the above mode, a size of the rotating handle is able to also be adjusted correspondingly. The rotating handle is designed to be smaller in size, to avoid the interference with the frame body 10.

Figure 5:
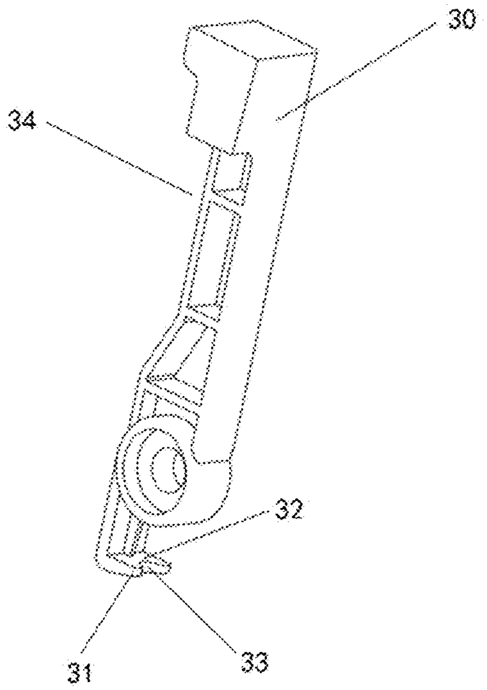
FIG. 5 is a structural schematic diagram of a rotating handle.

As shown in FIG. 5, in some embodiments, considering the convenience of operation, in the embodiment, an operation recess 34 for allowing a user to insert a hand is further provided on a side surface of the rotating handle 30, particularly a side surface parallel to the length direction. The arrangement of the operation recess 34 conforms to an operation habit, so that it is convenient for an operator to put a hand into the operation recess 34 to drive the rotating handle 30 to rotate.

As shown in FIG. 4, a middle region of the rotating handle 30 of the embodiment is provided with a rotating hole. Correspondingly, the frame body 10 is provided with a connecting post 14. The connecting post 14 is able to be fixed by riveting, welding, screw connection, or the like. A length of the connecting post 14 is greater than a length of the rotating hole. In this way, during the mounting of the rotating handle 30, the rotating hole is sleeved around the connecting post 14. Since the connecting post 14 is longer, a part of the connecting post 14 is able to extend out of the rotating hole. Meanwhile, the PCIE card module mechanism further includes a fastener 60. The fastener 60 is able to be a nut, a screw, or a component and is able to be connected to the connecting post 14 by a thread or in another manner. Therefore, after the fastener 60 and the connecting post 14 are tightened, the fastener 60 is able to abut against an end surface of the rotating hole. Since a diameter of the fastener 60 is greater than a diameter of the rotating hole, the rotating hole is fixed on the connecting post 14, so that the rotating hole is not able to be separated, thereby mounting the rotating handle 30 on the frame body 10. In order to ensure the smooth rotation of the rotating handle 30, the embodiment sets the diameter of the rotating hole to be greater than the diameter of the connecting post 14. This forms an interference fit between the rotating hole and the connecting post 14, so that the rotating handle 30 is able to be rotated smoothly relative to the connecting post 14 and jamming or another situation is avoided.

In some embodiments, the rotating handle 30 is designed as an integrated plastic component, which has a lighter structure and lower costs compared with a traditional sheet metal part. In an embodiment, the rotating handle 30 is able to also be set as a sheet metal part.

As shown in FIGS. 1-2, in the embodiment, the frame body 10 includes a first frame body and a second frame body. The first frame body and the second frame body are in butting fit to form an accommodating region for accommodating components. The frame body 10 is provided with a front end and a rear end that are opposite to each other. It should be noted that the front end and the rear end that are referred to herein are not contradictory to the first side and the second side mentioned above. The first side and the second side mentioned above are essentially the upper side and the lower side of the frame body 10 in FIG. 1. The front end and the rear end referred to herein are a left end and a right end of the frame body 10. The front end is one end facing a user when the user is in front of the server, and the rear end is one end away from the user. The rotating handle 30 is located at the front end. The PCIE card module mechanism further includes a cover member 70 and a latch member 80. The cover member 70 and the latch member 80 are both located at the rear end. A mounting structure such as a bayonet is usually arranged inside the chassis 90. A rear end of the PCIE card module mechanism, which is the rear end of the frame body 10, is usually placed directly at the bayonet. The rear end of the frame body 10 is fixed by limitation achieved based on the shape of the bayonet. In this way, due to the locking between the rotating handle 30 at the front end and the locking member 20, the frame body 10 is not able to move up and down, thereby fixing the frame body 10 inside the chassis 90. During mounting, the entire frame body 10 is tilted; the rear end of the frame body 10 is inserted into and placed at the bayonet; then the front end is placed downwards, so that the locking member 20 extends into the guide sleeve. The rotating handle 30 is then rotated to achieve the locking fit between the locking structure 31 and the locking member 20. This is able to complete the mounting and fixing of the frame body 10 inside the chassis 90.

In order to mount a PCIE card and other components on the frame body 10, the frame body 10 of the embodiment is provided with a mounting port for mounting components, a plurality of mounting ports are provided, so as to satisfy mounting requirements of different quantities of components. In practical use, not all the plurality of mounting ports are provided with components. It is often that only some components are mounted. In this case, some mounting ports remain empty because no components are mounted therein. Meanwhile, the plurality of mounting ports are also empty during transportation. Therefore, the PCIE card module mechanism of the embodiment further includes the cover member 70. The cover member 70 is detachably arranged at the mounting port. The cover member 70 is able to cover the mounting port that is not provided with components, thereby playing a protection and stabilization role.

Figure 6:
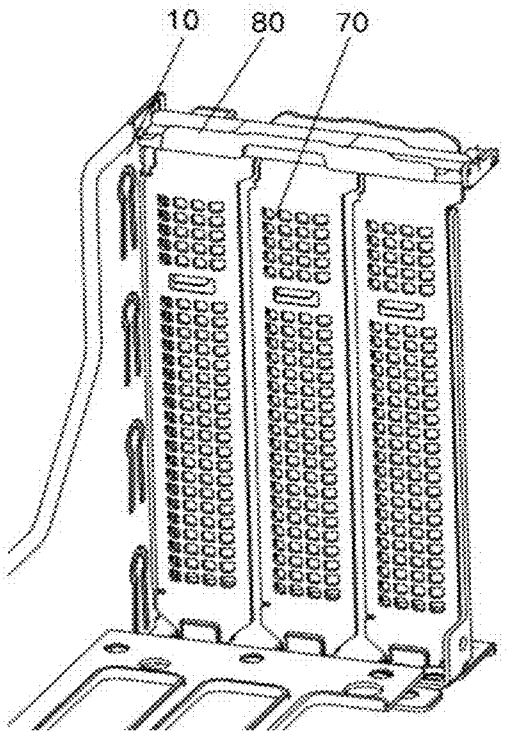
FIG. 6 is a structural schematic diagram of a cover member and a latch member when the latch member is located in a blocking position.
Figure 7:
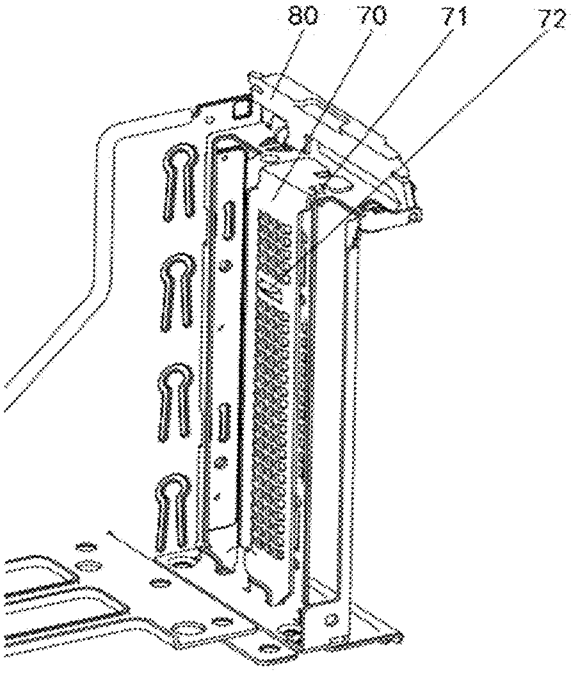
FIG. 7 is a structural schematic diagram of a cover member and a latch member when the latch member is located in an avoidance position.
Figure 8:
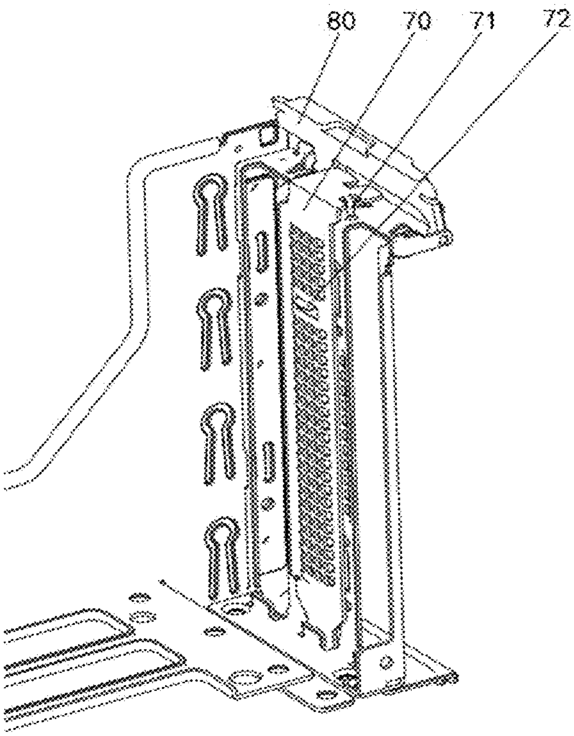
FIG. 8 is a structural schematic diagram of a cover member and a latch member when the latch member is located in an avoiding position and the cover member is removed.

As shown in FIG. 6 to FIG. 8, in the embodiment, the mounting port employs a long-strip structure. Correspondingly, the cover member 70 also employs a long-strip structure to ensure a covering effect on the mounting port. The cover member 70 includes a first end and a second end in the length direction. The frame body 10 is provided with a socket. The first end is plugged into the socket. The second end is provided with a limiting structure 71 that matches the frame body 10. The limiting structure 71 and the frame body 10 are in limiting fit. In this way, the first end of the cover member 70 is in limiting fit with the frame body 10 through a plugging socket, and the second end is in limiting fit with the frame body 10 through the limiting structure 71, so that the two ends of the cover member 70 are in limiting fit with the frame body 10, to fix the two ends of the cover member 70. In this way, the entire cover member 70 is fixed more firmly, thus avoiding a situation such as separation due to a factor such as vibration during use and transportation, and ensuring safety and stability of use.

It should be noted that in the embodiment, a connecting direction between the first side and the second side, a connecting direction between the front end and the rear end, and a length direction in which the cover member 70 is mounted at the mounting port are all perpendicular to each other.

Figure 10:
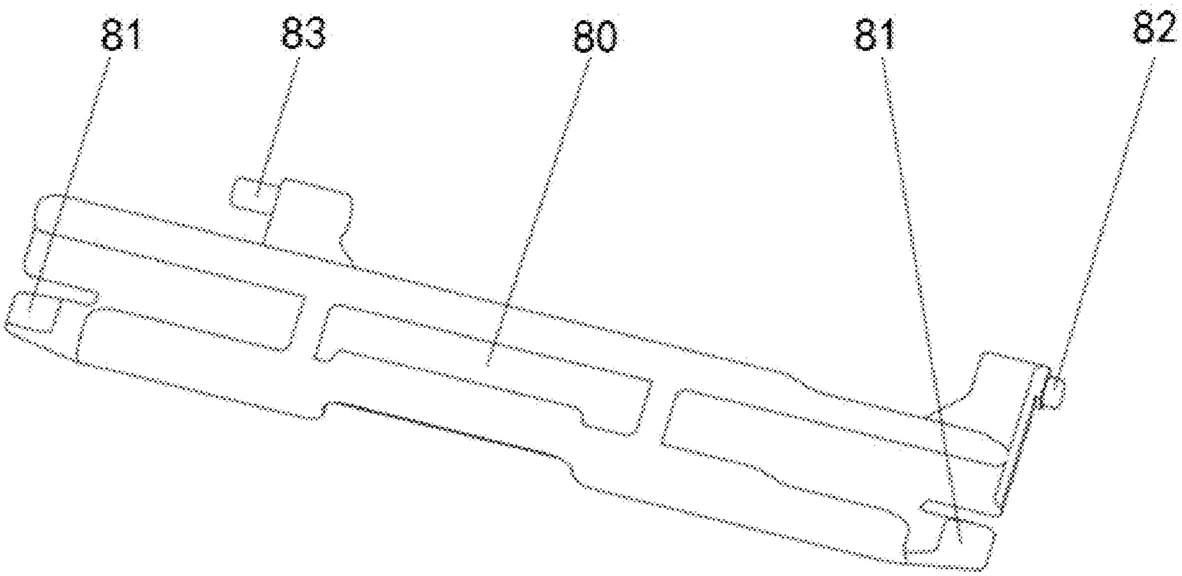
FIG. 10 is a structural schematic diagram of a latch member.

As shown in FIG. 10, the cover member 70 of the embodiment includes a cover section and a bending section. The cover section extends in the length direction of the cover member 70 and serves as a main body part of the cover member 70 to match the mounting port. The bending section is located at the second end of the cover member and is in bending connection to the cover section. In this way, the bending section is able to limit the position of the cover member 70 to an extent. When the cover member 70 is mounted on the frame body 10 in the length direction, and the cover member 70 moves in place, a side surface of the bending section abuts against the frame body 10, thereby mounting the cover member 70 in place. In an embodiment the cover member 70 is also able to employ another structural form. For example, it only has the cover section.

In the embodiment, the first end of the cover member 70 is able to be directly in plugging fit with the socket of the frame body 10, so that the plugging is only able to preliminarily fix the cover member 70 and the frame body 10, and is not able to implement complete fixation. Therefore, in the embodiment, the second end of the cover member 70, namely, the bending section is provided with a limiting protrusion for bending again. The limiting protrusion is bent relative to the bending section, so that an extension direction of the limiting protrusion is not perpendicular to a moving direction in which the first end is plugged into the frame body 10. In the embodiment, the limiting protrusion is parallel to the length direction of the cover member 70, namely, the moving direction in which the first end is plugged into the frame body 10. The limiting protrusion is used as the limiting structure 71. Correspondingly, the frame body 10 is provided with a through hole, so that when the first end of the cover member 70 is plugged into the socket, the limiting protrusion naturally extends into the through hole to implement the limiting fit with the frame body 10, thereby preventing the cover member 70 from moving in a direction perpendicular to the direction of being plugged into the frame body 10, and achieving an effect of stably mounting the cover member 70 on the frame body 10. When the limiting protrusion extends into the through hole, a part of the limiting protrusion extends out through the through hole. In this case, this part is able to be bent to abut against an edge of the through hole, thereby achieving an effect of stably and reliably fixing the cover member 70.

In an embodiment not shown, the limiting structure 71 employs a limiting groove. The frame body 10 is provided with a boss. When the cover member 70 is mounted on the frame body 10, the boss is located inside the limiting groove. In this case, an end portion of the boss is impacted to deform to increase the diameter and implementing a limiting fit between the boss and the limiting groove. Although the embodiment is able to achieve the effect of mounting the cover member 70 on the frame body 10, due to the poor stability of the fit formed between the boss and the limiting groove, separation may still occur during transportation and use. Therefore, it is more suitable to use the limiting protrusion in the embodiment.

As shown in FIGS. 6-8, in the embodiment, the PCIE card module mechanism further includes the latch member 80. The latch member 80 is movably connected to the frame body 10 and is located at the second end of the cover member 70. The latch member 80 has a blocking position that prevents the cover member 70 from being separated from the frame body 10 and an avoidance position that avoids a removal of the cover member 70. In this way, when the cover member 70 needs to be mounted, the latch member 80 is switched to the avoidance position, so that the cover member 70 is able to be mounted to the mounting port in the length direction. After the cover member 70 is mounted in place, the latch member 80 is switched to the blocking position. In this case, the latch member 80 is able to block reverse movement of the cover member 70, so that the cover member 70 is not able to reversely move. Due to the cooperation between the first end and the socket and the cooperation between the limiting protrusion of the second end and the through hole, the cover member 70 is able to be further stably and reliably mounted on the frame body 10.

Figure 9:
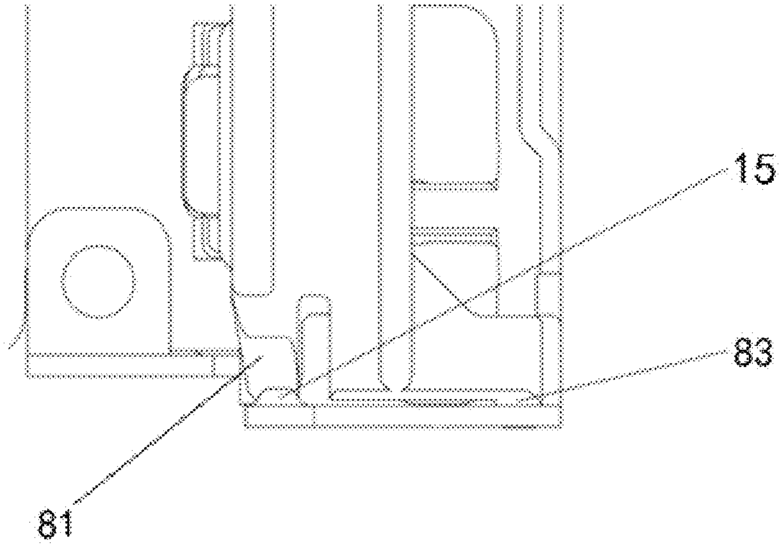
FIG. 9 is a structural schematic diagram of a claw structure.

As shown in FIGS. 9-10, in the embodiment, the latch member 80 is rotatably connected to the frame body 10. The rotatable connection between the latch member 80 and the frame body 10 is implemented by arranging a rotating shaft. The latch member 80 is further provided with a claw structure 81 which is deformable. By using a cantilever structure, the claw structure 81 is able to deform to an extent. Correspondingly, the frame body 10 is provided with a protruding structure 15 which protrudes out of a surface of the frame body 10. In a process that the latch member 80 switches between the blocking position and the avoidance position, under an action of an external force, the claw structure 81 passes through the protruding structure 15. The claw structure 81 deforms due to the blocking of the protruding structure 15, thereby crossing over the protruding structure 15 to implement position switching. After the position switching is completed, the protruding structure 15 has a stop effect on the claw structure 81. Without an external force, the claw structure 81 is not able to cross over the protruding structure 15, so that the latch member 80 is able to remain in the blocking position due to the abutment between the protruding structure 15 and the claw structure 81 after switching to the blocking position, thereby preventing the latch member 80 from moving towards the avoidance position.

As shown in FIG. 10, two claw structures 81 of the embodiment are provided. The claw structures 81 is provided at two opposite ends in the length direction of the latch member 80, so that the two ends of the latch member 80 is able to be limited by the cooperation between the claw structures 81 and the convex structure 15, thereby ensuring stability of the position of the latch member 80 and avoiding problems that a PCIE card or a stop piece at the lower end easily upwarps and is not fixed firmly because one end of the latch member 80 is fixed and the other end is not fixed, the PCIE card does not work stably, and the like.

The latch member 80 is provided with a first rotating shaft 82 and a second rotating shaft 83. The first rotating shaft 82 is located in an end region of a side edge, parallel to the length direction, of the latch member 80, and the second rotating shaft 83 is located in a middle region of the same side edge of the latch member 80. The latch member 80 is rotatably connected to the frame body 10 through the first rotating shaft 82 and the second rotating shaft 83. In this way, one of the first rotating shaft 82 and the second rotating shaft 83 is located at the end portion, and the other one is located in a middle position, which makes the rotation of the latch member 80 more stable and also ensures that the latch member 80 is able to be stably maintained in the blocking position when it is rotated to the blocking position. During position switching, the latch member 80 is able to be rotated only by a higher force, thus achieving a stable and reliable effect on the latch member 80.

Figure 11:
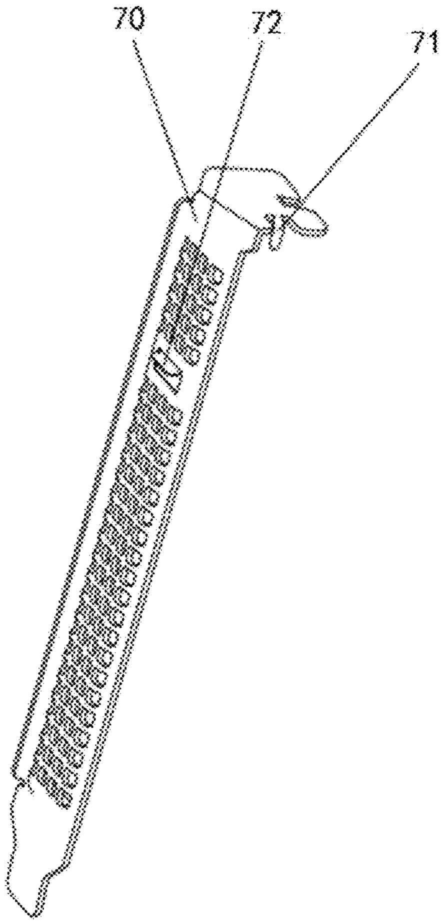
FIG. 11 is a structural schematic diagram of a cover member.

As shown in FIG. 11, in the embodiment, a surface, facing an inner side of the frame body 10, of the cover member 70 is provided with a protruding portion 72 for operation, and the protruding portion 72 protrudes out of the surface of the cover member 70. In this way, to remove the cover member 70, an operator needs to rotate the latch member 80 to the avoidance position, and the protruding portion 72 is pushed to drive the cover member 70 to be separated from the frame body 10, thereby implementing stable removal of the cover member 70 and avoiding inconvenient removal because of sliding caused by hand contact with the surface of the cover member 70. This allows the operator to reliably move the cover member 70 to improve easiness of a mounting operation. In an embodiment, the protruding portion 72 is also able to be omitted, and the surface of the cover member 70 is able to be set as a plane. In this case, the operator is able to drive the cover member 70 to move by directly operating the surface of the cover member 70.

The embodiment further provides a server, including a chassis 90 and the PCIE card module mechanism. The chassis 90 has a mounting position for mounting the PCIE card module mechanism. The PCIE card module mechanism is detachably arranged at the mounting position of the chassis 90. The locking member 20 is fixedly connected to the mounting position to cooperate with the rotating handle 30.

It should be noted that "a plurality of" in the above embodiments means at least two. From the above description, it can be seen that the embodiments of the present disclosure have achieved the following technical effects:

1. The problem that it is inconvenient to mount and remove a PCIE add-in card module in the related art is solved.
2. No screws or other components are required. Mounting and removal are able to be implemented by only rotating the rotating handle, so that the entire mounting and removal process is convenient and efficient, and the working efficiency is improved.
3. A damage to a fan caused by mis-touch of a PCIE card is reduced.
4. The PCIE card module mechanism has a simple overall structure and low costs and meets tool-less, low-cost, and high-reliability demands, and overall maintenance and application performance of the PCIE card module mechanism is improved.

Apparently, the described embodiments are merely some embodiments of the present disclosure, rather than all the embodiments. All other embodiments obtained by a person of ordinary skill in the art based on the embodiments of the present disclosure without making creative efforts shall fall within the protection scope of the present disclosure.

It should be noted that the terms used here are only for describing specific implementations and are not intended to limit the exemplary implementations according to the present disclosure. As used here, unless otherwise explicitly stated in the context, a singular form is also intended to include a plural form. In addition, it should also be understood that when the terms "include" and/or "comprise" are used in this specification, they indicate the existence of features, steps, operations, devices, assemblies, and/or combinations thereof.

It should be noted that the terms "first", "second", etc. in the specification and claims of the present disclosure and the above accompanying drawings are defined to distinguish similar objects, and do not have to be used to describe a specific order or sequence. It should be understood that such used data is interchangeable where appropriate, so that the implementations of the present disclosure described here can be implemented in an order other than those illustrated or described here.

The above descriptions are only specific embodiments of the present disclosure, and are not intended to limit the present disclosure. For those skilled in the art, the present disclosure may have various modifications and changes. Any modification, equivalent replacement, and improvement made within the spirit and scope of the present disclosure shall fall within the protection scope of the present disclosure.

What is claimed is:

1. A PCIE card module mechanism, comprising:

a frame body detachably mounted inside a chassis;

a locking member connected to the chassis, wherein the frame body is butted with the locking member in response to being mounted inside the chassis; and a rotating handle, wherein the rotating handle is rotatably connected to the frame body and has a locking position and an unlocking position; the rotating handle further is provided with a locking structure that is in locking fit with the locking member; in response to the rotating handle being located in the locking position, the locking structure and the locking member are in locking fit and lock the frame body onto the chassis; in response to the rotating handle being located in the unlocking position, the locking structure and the locking member are separated, and the frame body is able to be removed from the chassis;

the PCIE card module mechanism further comprises a guide sleeve, the guide sleeve is connected to the frame body; the guide sleeve is provided with a guide through hole; and in response to the frame body being butted with the chassis, the locking member is arranged inside the guide sleeve in a penetrating manner.

2. The PCIE card module mechanism according to claim 1, wherein the locking member comprises a locking recess; the locking structure is a locking protrusion; and in response to the rotating handle being located in the locking position, the locking protrusion is located inside the locking recess and prevents the frame body from moving in a direction of being separated from the chassis.

3. The PCIE card module mechanism according to claim 2, wherein the locking member comprises a first section and a second section that are connected in sequence in an axial direction; a diameter of the first section is less than a diameter of the second section; the second section is closer to the frame body than the first section; a circumferential side surface of the first section forms the locking recess; the rotating handle is provided with an extension section that is in bending connection; the extension section is provided with a groove; a side edge of the groove forms the locking structure; and in response to the rotating handle being located in the locking position, the first section is located inside the groove.

4. The PCIE card module mechanism according to claim 1, wherein the PCIE card module mechanism further comprises a reset member, the reset member abuts against the rotating handle and provides a reset force for the rotating handle to rotate towards the locking position.

5. The PCIE card module mechanism according to claim 1, wherein the frame body is provided with a stop structure; and the stop structure is located on a rotation path of the rotating handle and prevents a rotation of the rotating handle in response to the rotating handle being rotated to the locking position or the unlocking position.

6. The PCIE card module mechanism according to claim 5, wherein the stop structure comprises a first stop structure and a second stop structure; the first stop structure and the second stop structure are respectively located on two opposite sides of the rotating handle; the rotating handle abuts against the first stop structure in response to being rotated to the locking position; and the rotating handle abuts against the second stop structure in response to being rotated to the unlocking position.

7. The PCIE card module mechanism according to claim 1, wherein the frame body is provided with a first side and a second side that are opposite to each other; the locking member is located on the second side; the first side is provided with an avoidance recess; one end, located on the first side, of the rotating handle is provided with the locking structure; and one end, located on the second side, of the rotating handle is located inside the avoidance recess.

8. The PCIE card module mechanism according to claim 1, wherein the rotating handle is provided with a rotating hole; the frame body is provided with a connecting post; a length of the connecting post is greater than a length of the rotating hole; a diameter of the rotating hole is greater than a diameter of the connecting post; and the PCIE card module mechanism further comprises a fastener; and the fastener is connected to the connecting post and abuts against an end surface of the rotating hole.

9. The PCIE card module mechanism according to claim 1, wherein an operation recess for allowing a user to insert a hand is provided on a side surface of the rotating handle; and/or the rotating handle is an integrated plastic component.

10. The PCIE card module mechanism according to claim 1, wherein the frame body is provided with a mounting port for installing components; the PCIE card module mechanism further comprises a cover member; and the cover member is detachably arranged at the mounting port and is able to cover the mounting port.

11. The PCIE card module mechanism according to claim 10, wherein the cover member comprises a first end and a second end; the frame body is provided with a socket; the first end is plugged into the socket; the second end is provided with a limiting structure that matches the frame body; and the limiting structure is in limiting fit with the frame body.

12. The PCIE card module mechanism according to claim 11, wherein a second end of the cover member is provided with a limiting protrusion formed by bending; the limiting protrusion is used as the limiting structure; the frame body is provided with a through hole; and in response to a first end of the cover member extending into the socket, the limiting protrusion is located inside the through hole.

13. The PCIE card module mechanism according to claim 11, wherein the limiting structure is a limiting groove; the frame body is provided with a boss; and in response to the cover member being mounted on the frame body, the boss is located inside the limiting groove.

14. The PCIE card module mechanism according to claim 10, wherein the cover member comprises a cover section and a bending section; the cover section extends in a length direction of the cover member and matches the mounting port; and the bending section is in bending connection to the cover section; and/or a surface, facing an inner side of the frame body, of the cover member is provided with a protruding portion for operation.

15. The PCIE card module mechanism according to claim 10, wherein the PCIE card module mechanism further comprises a latch member, the latch member is movably connected to the frame body and is located at one end of the cover member; and the latch member has a blocking position that prevents the cover member from being separated from the frame body and an avoidance position that avoids a removal of the cover member.

16. The PCIE card module mechanism according to claim 15, wherein the latch member is provided with a claw structure which is deformable; the frame body is provided with a protruding structure; and in response to the latch member being located in the blocking position, the protruding structure abuts against the claw structure and prevents the latch member from moving towards the avoidance position.

17. The PCIE card module mechanism according to claim 15, wherein the latch member is provided with a first rotating shaft and a second rotating shaft; the first rotating shaft is located in an end region of a side edge of the latch member, and the second rotating shaft is located in a middle region of the side edge of the latch member; and the latch member is rotatably connected to the frame body through the first rotating shaft and the second rotating shaft.

18. The PCIE card module mechanism according to claim 15, wherein the latch member is rotatably connected to the frame body.

19. The PCIE card module mechanism according to claim 1, wherein the frame body comprises a first frame body portion and a second frame body portion; the first frame body portion and the second frame body portion form an accommodating region for accommodating components; the frame body is provided with a front end and a rear end that are opposite to each other; the rotating handle is located at the front end; the PCIE card module mechanism further comprises a cover member and a latch member; both the cover member and the latch member are located at the rear end;

the locking member comprises a first section and a second section that are connected in sequence in an axial direction; a diameter of the first section is greater than a diameter of the second section; the second section is closer to the frame body than the first section; one end of the rotating handle is provided with an extension section that is in bending connection; the extension section is provided with a groove; in response to the rotating handle being located in the locking position, the first section is located inside the groove; a side edge of the extension section abuts against an end surface of the second section and prevents the frame body from moving in a direction of being separated from the chassis;

a middle region of the rotating handle is provided with a rotating hole; the frame body is provided with a connecting post; the connecting post is located inside the rotating hole; the rotating handle is rotatable relative to the connecting post; the PCIE card module mechanism further comprises a reset member; the reset member is sleeved between the connecting post and the rotating hole and provides a reset force for the rotating handle to rotate towards the locking position;

the cover member comprises a first end and a second end; the first end is plugged into the frame body; the second end is provided with a limiting protrusion formed by bending, and an extension direction of the limiting protrusion is parallel to a moving direction in which the first end is plugged into the frame body; the frame body is provided with a through hole; in response to the first end of the cover member extending into the frame body, the limiting protrusion extends into the through hole and prevents the cover member from moving in a direction perpendicular to a direction of being plugged into the frame body;

the latch member is a sheet metal part and is rotatably connected to the frame body; the latch member is located at the second end of the cover member; a claw structure is provided at two ends of the latch member; the frame body is provided with a protruding structure; and in response to the latch member being flipped to a position for blocking the cover member, the claw structure deforms and crosses over the protruding structure, and the protruding structure prevents the claw structure from being reversely flipped.

20. A server, comprising a chassis and the PCIE card module mechanism according to claim 1, wherein the PCIE card module mechanism is detachably arranged inside the chassis.

* * * * *